Jan. 28, 1964     M. TEN BOSCH ETAL     3,119,259
AIRSPEED METER

Filed Oct. 24, 1958                           2 Sheets-Sheet 1

INVENTOR
MAURITS TEN BOSCH
DONALD S. BAYLEY
BY
ATTORNEY 3,119,259
AIRSPEED METER
Maurits Ten Bosch, White Plains, and Donald S. Bayley, Bedford Village, N.Y., assignors to M. Ten Bosch, Inc., Pleasantville, N.Y., a corporation of New York
Filed Oct. 24, 1958, Ser. No. 769,362
5 Claims. (Cl. 73—181)

The present invention relates to an air speed meter and although it relates to an airspeed meter having universal application, it is particularly directed to an airspeed meter of the type which record relatively low airspeed velocities in connection with relatively low speed airborne vehicles, such as, for example, helicopters.

The general airspeed meters for aircraft and other airborne vehicles do not function satisfactorily at low speeds and are not most satisfactorily adaptable to low speed aircrafts such as helicopters.

It is among the objects of the present invention to provide a novel true airspeed meter suitable for use in helicopter-type aircraft.

Another object is to provide a novel true airspeed meter which will effectively measure low airspeeds of airborne vehicles whether the direction be forward, reverse, to either side, or hovering and which will have effective measuring power at a wide range of speeds ranging from zero to 180 knots in any direction in the measuring plane of the moving unit.

Another object is to provide a low airspeed meter of greater simplicity, substantial ruggedness and ease of maintenance which may be manufactured at low cost and is adaptable to quantity production.

Still further objects and advantages will appear in the more detailed description set forth in below, it being understood, however, that this more detailed description is given by way of illustration and explanation only and not by way of limitation, since various changes therein may be made by those skilled in the art without departing from the scope and spirit of the present invention.

In the preferred form of the present invention, the airspeed meter operates in its determination in the airspeed by providing a moving mass of ionized air particles constituting an electrical conductor which moves at right angles to a magnetic field.

This mass of ionized air particles may be constituted by subjecting outside air as it enters into a defined or predetermined space to an ionizing source such as a radio-active material, strontium 90 being a typical example.

In addition, a medium frequency oscillating magnetic field is set up at right angles to the flow of the incoming or passing ionized air, with the result that there is achieved a moving mass of ionized air particles constituting an electrical conductor moving at right angles to a magnetic field.

The measurement of the true airspeed then may be determined in view of the fact that the aircraft moving in the magnetic field carries with it an induced electrical field which is proportional to the magnetic field strength and to the velocity.

In a desired form, the outside air may enter a space between streamlined end plates upon the interior faces of which is positioned the suitable ionizing source such as strontium 90.

The same effect may also be achieved by having an airflow blow through a tube or over a plate similarly coated or surfaced with strontium 90 to ionize the incoming air.

Between these plates or across the ionized airstream, there is desirably set up a varying magnetic field such as a 400 cycle magnetic field of approximately one thousand gauss strength.

Since the moving mass of ionized air particles will then constitute an electrical conductor moving at right angles to the magnetic field, the voltage induced in the moving conductor is proportional to the field strength and to the velocity.

Now if two electrodes are set up in the airstream so that a straight line joining them is normal to the direction of the ionized air, then the potential difference in volts set up between these electrodes will be $$V = 10^{-8} vBl$$

where:

$l$ = distance between the electrodes in feet.
$B$ = flux density in lines per square foot.
$v$ = component of velocity of the mass of ionized air particles in feet per second at right angles to the magnetic flux and to the line 1.

Another pair of electrodes may be set at right angles to the first pair perpendicularly to the measuring plane of the instrument and normal to the 400 cycle magnetic field.

This arrangement will provide an instrument for measuring two rectangular components of the total speed of the ionized air relative to the magnetic field measured in the plane normal to this field and the second pair of electrodes which are placed at right angles to the first pair of electrodes will act as the slip rings in the usual electrical generator.

When the unit is properly placed on an airborne vehicle such as a helicopter, the local velocity of the ionized air can be made proportional to the true airspeed of the helicopter relative to the free air independent of the angle of attack.

The measuring electrodes are the input leads to suitable high input impedance amplifiers.

The amplified voltage outputs are then made available for visual indicators or for tie-in with other units as required.

The primary requirement on the amplifiers is that they have a high input impedance compared to the impedance of the ionized air mass.

The circuits suitable for airborne use require that the impedance across the electrodes be made low which is accomplished by the ionization of the flowing airstream.

In determining the airspeed, it must be considered that there will be established between the electrodes an equilibrium ion density at which the rate of production of ions by the source equals the rate at which the ions are lost because they recombine and because they are carried away by the airstream.

If a source of ionization is perfectly uniform and produces $q$ ion pairs/sec./cm.$^3$ in a volume of unit cross-section and length L and if the air is moving with velocity $v$ for a distance X in the direction of L, with a recombination coefficient $r$, the ion density $n$ will in general be a function of the distance X, measured along direction L, and of the time $t$.

For air, at sea level, $r = 2 \times 10^{-6}$ cm.$^3$/sec. At $X = 0$, the arriving air is free of ions, and the ion density $n$ is zero. With this boundary condition, and for $r = 0$, the equation $$n = \frac{qX}{v}, \quad 0 < X < L$$

At the other boundary of the source, the distance traveled $X$ = full distance $L$, and the region beyond it becomes supplied by the airstream with an ion density whose initial value is $$n = \frac{qL}{v}$$

For $X>L$, the source strength $q$ is zero and the effect of recombination becomes important at low airspeeds. In this region the equation is $$n=\frac{qL}{v}\left(l+r(X-L)\frac{qL}{v^2}\right)^{-1}, X>L$$

In view of the above effect, the electrode should be located in the region of the source $q$ of the ionization particularly because of the effect of recombination of low airspeeds.

The preferred configurations are a central cylindrical source parallel to the magnetic field or ring sources parallel to the airstream.

At $v=1$ knot, $n$ drops from $2\times10^{10}/cm.^3$ at the edge of the source to $2\times10^8/cm.^3$ at a point about 1 mm. away. At $v=100$ knots, however, $n$ drops only to half its initial value ($2\times10^8$) at a point 10 cm. from the edge.

In addition or in lieu of the radioactive source, it is possible to use a glow discharge or ultraviolet light lamp which has the disadvantage of requiring auxiliary equipment.

In addition to or in lieu of strontium 90, it is possible to use other elements having long one-half life periods which do not require frequent replacements, such as polonium, requiring replacement about once a year.

Where materials such as plutonium, uranium, radium, are utilized, shielding is necessary, and such additional equipment is not desirable.

The variation of pressure with altitude will not have a primary effect on the realizable resistivity.

The decrease in ion pair production with altitude is essentially compensated as far as the resistivity is concerned by the increase in ionic mobility. The former is proportional to the air density, while the latter varies inversely at pressures over the required altitude range.

In the measuring circuit, it is desirable to use a servo driven compensating arrangement with the measurement of the signal being independent of the internal resistance of the probe.

The probe electrodes are arranged accurately in parallelism to the magnetic field and although they do not require shielding from leakage currents, they must be well insulated from one another to avoid drawing current through the high impedance of the ionized air.

To achieve this insulation, the electrode may be surrounded by a good insulator which extends from the exposed end of the electrode to the grid of an electrometer tube.

This insulation is desirably surrounded throughout its length by a grounded shield or a guard ring which prevents leakage between the electrodes.

The compensating circuit will maintain the insulated electrode essentially at ground potential insulation and the leakage will affect only the magnitude of the error signal without effecting the calibration of the system.

In a compensating circuit, a servo motor will control the compensating voltage in such a manner that the 400 cycle current in the grid resistor of the electrometer tube amplifier remains essentially at zero.

Because of the high impedance level of the input circuit, the electrometer tube and the cathode follower stage, used to reduce the impedance level will be incorporated in the probe assembly, and this assembly may be hermetically sealed or potted.

A standard transistor servo amplifier is used to provide the servo motor excitation.

The 400 cycle voltage in the compensating circuit is arranged to have a 180 degree phase relationship with respect to the current in the exciting coil.

Therefore, the compensating voltage will counteract the desired induced voltage.

If the electrodes are not exactly aligned with the magnetic field, there can be a small induced voltage due to transformer action.

However, this undesired voltage is in a quadrature phase relationship to the exciting current, and the circuit therefore will discriminate against this undesired signal.

With the foregoing and other objects in view, the invention consists of the novel construction, combination and arrangement of parts as hereinafter will be more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
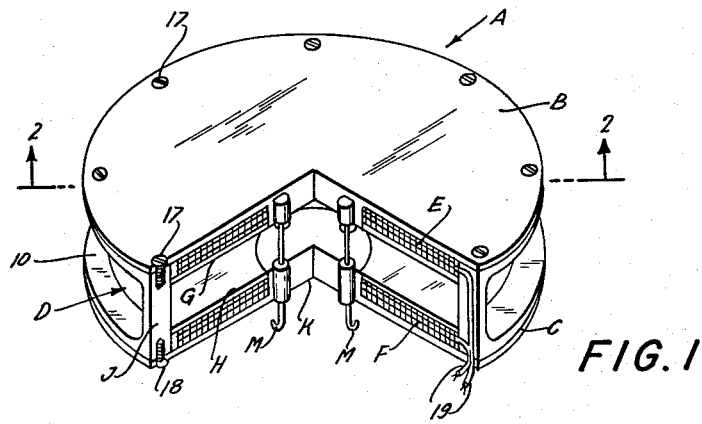
FIG. 1 is a top perspective view of one form of true airspeed meter or transducer according to the present invention, in partial section to show the interior construction.
Figure 2:
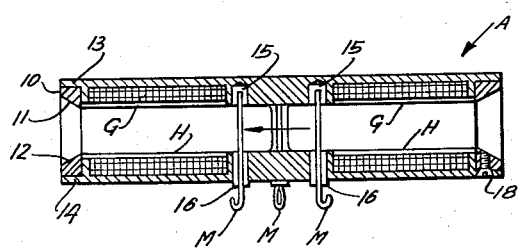
FIG. 2 is a transverse vertical sectional view upon the line 2—2 of FIG. 1.

Referring to FIGS. 1 and 2, the active unit A of the meter is shown in the form of a disk with separated upper and lower plates B and C having intervening airspace D through which the air may pass.

Each plate has an electrical coil E and F for generating the magnetic field.

The interior faces G and H are provided with radio-active surfacings which may be applied onto the face of insulating materials in which the coils E and F are embedded.

Desirably the outer ring J as well as the core K are of soft iron and the electrodes or probes M which may be arranged ninety degrees apart are positioned interiorly of the coils E and F and at the center of the disk arrangement.

In the specific form as shown, there are entrance elements 10 which have beveled inlet faces 11 and 12 which fit into the recesses 13 and 14.

The ends of the probes M are embedded in plastic carrier members 15 and 16 which fit into recesses in the meter unit A.

The inlet unit 10 is held in position by the upper screws 17 and the lower screws 18.

The electric connections are made as indicated at 19 through the body of the unit A.

In the device as shown in FIGS. 1 and 2, the air may enter at any point on the periphery and leave at the other side passage across the probes M after it has been ionized by the radioactive material on the surfaces G and H.

As it passes the probes M, a voltage will be induced.

The coils E and F will be subjected to an electrical current through the leads 19 to set up a cyclicly varying magnetic field.

Figure 3:
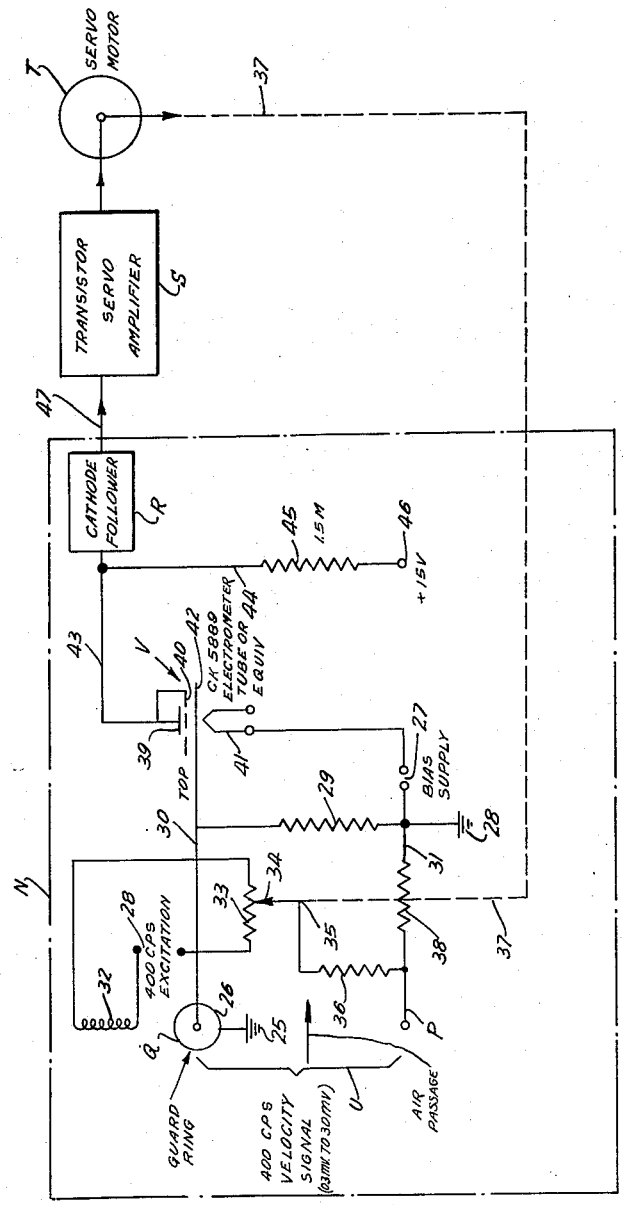
FIG. 3 is a diagrammatic layout of the circuitry which may be utilized in connection with the present device.

Referring to the circuitry of FIG. 3, there is shown a velocity probe assembly N which includes the unshielded electrode P and the shielded electrode assembly Q.

This circuitry will lead to a cathode follower R in the assembly and then to a servo amplifier S and servo motor T.

Between the electrode P and the electrode Q, as indicated by the bracket U, will be generated a 400 cycle per second velocity signal of 0.3 to 30 millivolts.

The electrode Q will be provided with a guard ring 26, which is insulated from the electrode Q and grounded at 25.

There will be a bias supply at 27 and a 400 cycle per second excitation at 28.

There also will be a ground at 128 and a fixed resistance 29 across the leads 30 and 31 to the electrodes P and Q.

Associated with the excitation 28 will be the impedance 32 and also the variable resistance 33 having the moving contact 34.

The moving contact 34 is connected by means of the junction 35 through the resistance 36 to the electrode P and also by the circuit or connection 37 to the servo motor T.

In FIGURE 3 lead 31 is the connection between the junction of bias supply 27, ground 28, and resistor 29 to the resistor 38.

The electrometer tube V will have the plate 39, the grid 40 and the cathode 41, and the control grid 42 constituting the terminal of the lead 30 passing through the electrode Q. The tetrode tube V as shown has two grids 40 and 42, with the latter being a control grid. This tube has a designation CK5889.

From the electrometer tube, the conduit 43 will extend to the cathode follower R with the intermediate connection at 44 through the resistance 45 to the feed 46.

From the cathode follower R, the lead 47 will pass through the transistor servo amplifier S and to the servo motor T.

The servo motor T has a return connection as indicated at 37 to the movable contact 34 which will decrease the error signal to zero.

The circuit as shown in FIG. 3 is a compensating circuit using minimum current and eliminating the effect of any variations in the magnetic field.

The effect of leakage currents will be minimized or eliminated.

The device as shown in FIGS. 1 and 2 together with the circuitry of FIG. 3 has no moving parts exposed to atmospheric conditions and the unit as shown in FIGS. 1 and 2 will be as effective in snow or ice or upon exposure to rain.

Figure 4:
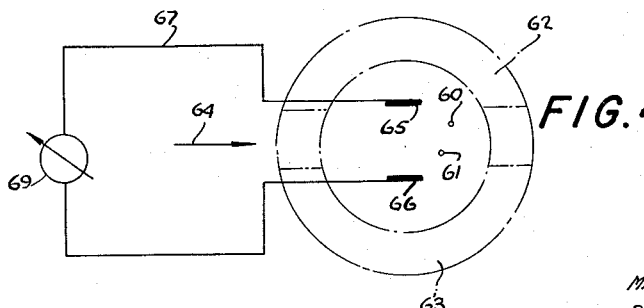
FIG. 4 is a diagrammatic side sectional view illustrating an alternative form of measuring device.

In the alternative arrangement as diagrammatically shown in FIG. 4, the tubular member 60 has the surfacing 61 of radioactive material and the magnetic coils 62—63.

The airstream will be, as indicated at 64, with the opposing probes 65 and 66.

These probes will have electrical connections 67 and 68 to the circuitry, as indicated in FIG. 3, which circuitry is indicated in FIG. 4 at 69.

The tubular member 60 is shown in section and with its axis extending from right to left the upper section being indicated at the coil 62 and the lower section at the coil 63.

The surfacing 61 is applied to the inner semicylindrical surface as shown and the probes 65 and 66 are connected by the wires 67 and 68 to the circuit arrangement at 69 which may be of the same character as already shown and described in connection with FIG. 3.

Referring to the circuitry arrangement shown in FIG. 3, the arrangement to the left enclosed in the dot and dash lines constitutes the velocity probe assembly and the signal from the velocity probes or electrodes M, four of which may be used at angles of 90° to each other, will be used to measure the velocity through the servo driven compensating circuit.

This circuit eliminates any variation due to internal resistance to the probes and also eliminates the effect of radiation in the magnetic field.

The electrodes are indicated at P and Q in FIG. 3 and these electrodes constitute essentially short wires arranged accurately parallel to the magnetic field.

The electrode P requires no shielding from leakage currents since it is at a low impedance level with respect to ground while electrode Q should be well insulated from electrode P to avoid drawing current through the high impedance of the ionized air.

Electrode Q is desirably surrounded by a good insulator such as Teflon which extends from the exposed end of the grid 40 of the electrometer tube V and such insulation is surrounded throughout its length by a grounded shield or guard ring 26 which prevents leakage between the electrodes P and Q.

The circuit in FIG. 3 will maintain the electrode P essentially at ground potential insulation and leakage will effect only the magnitude of the air signal and does not alter the calibration of the system.

The servo motor T will determine the reading that may be had.

A tubular member of this type should face in a number of directions so as to obtain readings of the lateral and oblique movements as well as fore and aft movements.

It is thus apparent that the present applicant has achieved a true airspeed meter particularly suitable for low speed airborne vehicles which measure a range of speed from zero to 185 knots in any direction in the measuring plane of the metering unit whether the direction be forward or reverse or to either side or hovering.

The lack of moving parts in the meter unit itself will give great simplicity, maximum ruggedness and ease of maintenance.

The device shown may not only be maintained with low cost but also be manufactured readily and it is adaptable to quantity production.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A true airspeed meter for helicopters and airborne vehicles for measuring velocities ranging from 0 to 185 knots as well as up to 200 to 300 knots in any direction whether forward, reverse, to either side, or hovering, comprising a plurality of closely spaced plates forming a flat narrow air space through which the air is caused to flow, means to create a magnetic field across said space and means to ionize the air while so flowing, a plurality of electrodes set up in the airstream adjacent to the ionized and magnetic zones and means to measure the voltage induced by the moving ionized airstream across the electrodes, said means to ionize the air consisting of a surfacing of radioactive material on each side of the stream of air.

2. An airspeed meter comprising parallel closely spaced upper and lower separated plates between which air is caused to flow, said plates being provided with means to ionize the flowing air and also provided with annular coils in each plate to generate a magnetic field thereacross and to generate a voltage as a result of said movement of ionized air through said magnetic field and means to measure said voltage to determine the airspeed, said last mentioned means serving to generate an error signal and said means also having a servo arrangement to reduce said error signal to zero.

3. A low air speed meter of the type having ionized air particles constituting an electric conductor moving at right angles to a magnetic field, said ionized air particles being created in the outside air as it enters a predetermined space in the meter due to action of a radioactive material, said meter comprising closely spaced parallel upper and lower disk plates having insulating inside opposite faces with an intervening airspace through which the air passes, annular electrical coils positioned in said plates for generating a magnetic field across said airspace, radio active surfacings on said inside faces of said plates and electrode probes extending across said spaces positioned ninety degrees apart interiorly of said annular coils and at the center of said airspace and said plates.

4. The meter of claim 3, said plates consisting of circular disks and having connecting bars and spacer members at the periphery thereof and the insulating opposite faces carrying said radioactive surfacing and the ends of said probes being mounted by insulating blocks in the central portion of the upper and lower plates.

5. An airspeed meter for determining airspeed by providing a moving mass of ionized air particles moving parallelly of a measuring plane and at right angles to a magnetic field by subjecting outside air as it enters into a defined space to an ionizing source consisting of radio-active material while a medium frequency oscillating magnetic field is set up at right angles to the flow of the passing ionized air, said meter comprising two closely spaced circular parallel plates between which the air particles pass in an airstream, the interior faces of which plates are surfaced with coating of a radioactive material, electrical coils positioned on each plate having planes parallel to each other and extending around the periphery of the plates to set up a 400 cycle magnetic field of about one thousand gauss strength, a pair of electrodes set up in the airstream so that a straight line joining them is normal to the direction of passage of the air particles, another pair of electrodes set at right angles to the first pair perpendicularly to the measuring plane of the instrument and normal to the 400 cycle magnetic field and circuitry to determine the airspeed by the potential difference in volts set up between the electrodes.

References Cited in the file of this patent

UNITED STATES PATENTS

| | | |
|---|---|---|
| 2,149,847 | Kolin | Mar. 7, 1939 |
| 2,611,268 | Mellen | Sept. 23, 1952 |
| 2,627,543 | Obermaier | Feb. 3, 1953 |
| 2,632,326 | Stuart | Mar. 24, 1953 |
| 2,757,538 | Soffel | Aug. 7, 1956 |
| 2,861,452 | Morgan | Nov. 25, 1958 |
| 2,893,243 | Hurley | July 7, 1959 |

OTHER REFERENCES

Einhorn, H. D. in Transactions of the Royal Society of South Africa, vol. 28 (1940–1941) pp. 143–160.

Guelke et al., in Journal of the Institution of Electrical Engineers, v. 94, part 2 and 3, 1947, pages 71–74.

Lovelock et al., in Journal of Scientific Instruments and of Physics in Industry, November 1949, pages 367–370.